(12) United States Patent
Murthy et al.

(10) Patent No.: US 12,337,911 B2
(45) Date of Patent: Jun. 24, 2025

(54) TRAILER CHANGE DETECTION SYSTEM FOR COMMERCIAL VEHICLES

(71) Applicant: Stoneridge, Inc., Novi, MI (US)

(72) Inventors: Banuprakash Murthy, Novi, MI (US); Naveen Bonagiri, Northville, MI (US); Vamsi Konka, Novi, MI (US); Troy Otis Cooprider, White Lake, MI (US)

(73) Assignee: STONERIDGE, INC., Novi, MI (US)

( * ) Notice: Subject to any disclaimer, the term of this patent is extended or adjusted under 35 U.S.C. 154(b) by 41 days.

(21) Appl. No.: 18/367,080

(22) Filed: Sep. 12, 2023

(65) Prior Publication Data

US 2024/0083531 A1 Mar. 14, 2024

Related U.S. Application Data

(60) Provisional application No. 63/405,919, filed on Sep. 13, 2022.

(51) Int. Cl.
*B62D 63/08* (2006.01)
*B60R 1/00* (2022.01)
*G06V 20/56* (2022.01)

(52) U.S. Cl.
CPC ............... *B62D 63/08* (2013.01); *B60R 1/00* (2013.01); *B60R 1/002* (2013.01); *G06V 20/56* (2022.01)

(58) Field of Classification Search
CPC . B62D 63/08; B60R 1/002; B60R 2300/8046; B60R 2300/8066; B60R 1/00; G06V 20/56
See application file for complete search history.

(56) References Cited

U.S. PATENT DOCUMENTS

| | | | |
|---|---|---|---|
| 6,819,980 B2 | 11/2004 | Bauer et al. | |
| 7,477,972 B2 | 1/2009 | Stavroff et al. | |
| 7,734,102 B2 * | 6/2010 | Bergeron | G06T 7/0004 382/151 |
| 9,030,321 B2 | 5/2015 | Breed | |

(Continued)

FOREIGN PATENT DOCUMENTS

| | | |
|---|---|---|
| GB | 2585895 A | 1/2021 |
| TW | 432926 B | 4/2014 |

OTHER PUBLICATIONS

International Search Report and Written Opinion for International Application No. PCT/US2023/032479 mailed Dec. 8, 2023.

(Continued)

*Primary Examiner* — Timothy Wilhelm
(74) *Attorney, Agent, or Firm* — Carlson, Gaskey & Olds, P.C.

(57) ABSTRACT

A method for detecting a load status change of a trailer includes responding to a first triggering event by storing a first snapshot of a trailer that is generated by at least one camera that is local to a vehicle that includes the trailer, responding to a subsequent second triggering event by storing a second snapshot of the trailer that is generated by the at least one camera that is local to the vehicle that includes the trailer, comparing the first snapshot to the second snapshot and determining a deviation between the image of the first snapshot and the image of the second snapshot, and identifying a trailer load status change as having occurred in response to the deviation exceeding a predefined magnitude.

18 Claims, 6 Drawing Sheets

(56) References Cited

U.S. PATENT DOCUMENTS

| | | | |
|---|---|---|---|
| 9,177,210 B2* | 11/2015 | King | B66F 9/0755 |
| 9,549,105 B2* | 1/2017 | De Geeter | B66C 19/002 |
| 10,005,456 B2* | 6/2018 | Anderson | B60P 7/06 |
| 10,158,842 B2* | 12/2018 | McCloskey | H04N 13/204 |
| 10,311,315 B2 | 6/2019 | Drazan et al. | |
| 10,647,369 B2 | 5/2020 | Weaver et al. | |
| 10,854,055 B1* | 12/2020 | Cornell | G08B 29/186 |
| 10,858,053 B2 | 12/2020 | Bean et al. | |
| 11,062,463 B2* | 7/2021 | Gabel | G06T 7/254 |
| 11,203,287 B2* | 12/2021 | Lotz | B60R 1/25 |
| 11,272,145 B2 | 3/2022 | Somers et al. | |
| 11,292,387 B2* | 4/2022 | Maruoka | B62D 13/06 |
| 11,580,484 B2* | 2/2023 | Patnaik | G06Q 10/083 |
| 11,587,333 B2* | 2/2023 | Sim | B60P 7/0861 |
| 11,661,006 B2* | 5/2023 | Gali | H04N 5/265 |
| | | | 348/38 |
| 12,110,031 B2* | 10/2024 | Naiel | B60W 40/13 |
| 12,115,910 B2* | 10/2024 | Penaloza | G05D 1/0225 |
| 12,117,844 B1* | 10/2024 | Greenbaum | G05D 1/0246 |
| 12,142,096 B2* | 11/2024 | Palmer | G07C 5/0866 |
| 12,157,485 B2* | 12/2024 | Hawley | G06V 20/59 |
| 2010/0198491 A1 | 8/2010 | Mays | |
| 2014/0036072 A1* | 2/2014 | Lyall | G06V 20/52 |
| | | | 348/143 |
| 2014/0067313 A1* | 3/2014 | Breed | G06V 20/52 |
| | | | 702/141 |
| 2016/0050356 A1* | 2/2016 | Nalepka | H04N 7/181 |
| | | | 348/148 |
| 2016/0239801 A1* | 8/2016 | Burch, V | G06Q 10/0838 |
| 2016/0297361 A1* | 10/2016 | Drazan | B60R 1/26 |
| 2017/0161586 A1* | 6/2017 | Xu | H04N 7/183 |
| 2017/0225639 A1 | 8/2017 | Chacon et al. | |
| 2017/0351268 A1* | 12/2017 | Anderson | G07C 5/0825 |
| 2018/0244187 A1* | 8/2018 | Strano | H04N 7/183 |
| 2018/0352198 A1* | 12/2018 | Raasch | G06V 10/20 |
| 2019/0271582 A1* | 9/2019 | Bennett | G01F 23/2928 |
| 2020/0031284 A1* | 1/2020 | Onica | G06T 7/70 |
| 2020/0128226 A1* | 4/2020 | Krishnamurthy | G06Q 10/083 |
| 2020/0202544 A1* | 6/2020 | Barish | G06T 7/55 |
| 2020/0279377 A1* | 9/2020 | Gabel | G06T 7/254 |
| 2020/0285913 A1* | 9/2020 | Gavrilovic | H04N 23/90 |
| 2021/0046987 A1 | 2/2021 | Bean et al. | |
| 2021/0046988 A1 | 2/2021 | Bean et al. | |
| 2021/0084458 A1 | 3/2021 | Arena | |
| 2021/0248398 A1* | 8/2021 | Gencaslan | G06T 7/0004 |
| 2021/0309148 A1* | 10/2021 | Watanabe | B60R 1/27 |
| 2023/0206497 A1* | 6/2023 | Sharma | B60R 1/28 |
| | | | 701/33.1 |
| 2023/0249673 A1* | 8/2023 | Diessner | B60W 10/22 |
| | | | 701/38 |
| 2024/0034116 A1* | 2/2024 | Coombs | B60G 17/0165 |

OTHER PUBLICATIONS

International Preliminary Report on Patentability for International Application No. PCT/US2023/032479 mailed Oct. 22, 2024.

Ashutosh, Saxena, et al., "Make3D: Depth Perception from a Single Still Image," In Proceedings of the 23rd National Conference on Artificial Intelligence, AAAI Press, 2008, 1571-1576, vol. 3, Stanford University, Stanford, CA.

* cited by examiner

TRAILER CHANGE DETECTION SYSTEM FOR COMMERCIAL VEHICLES

CROSS-REFERENCE TO RELATED APPLICATION

This application claims priority to Untied States Provisional Application No. 63/405,919 filed Sep. 13, 2022.

TECHNICAL FIELD

This disclosure relates to commercial vehicle monitoring, and particularly to monitoring a commercial vehicle for changes in the status of the trailer between engine cycles.

BACKGROUND

Camera monitor systems (CMS) utilize one or more cameras to provide an enhanced field of view to a vehicle operator. In one example, mirror replacement systems, and camera systems for supplementing mirror views, are utilized in commercial vehicles to enhance the ability of a vehicle operator to see a surrounding environment. In some examples, the camera monitoring systems cover a larger field of view than conventional mirror based systems, or include views that are not fully obtainable via a conventional mirror based system.

Some vehicle operations are dependent on, or otherwise utilize, the load within the trailer. By way of example, a kinematic model of trailer motion may require knowledge of whether the trailer is fully loaded, partially loaded, or empty in order to provide a more accurate model of the trailer behaviors. Further, the particular lean, or tilt of the trailer will impact the operations of the trailer. While the load is not expected to change during operation of the vehicle, it is important to identify when the load has changed between operations in order to ensure that operations using the load status operate correctly. It is not always possible to rely on the driver or vehicle operator to identify that these changes have occurred, as the driver may be away from the vehicle during loading and unloading and/or during any other extended time period while the vehicle is off.

SUMMARY

In one exemplary embodiment, a method for detecting a load status change of a trailer includes responding to a first triggering event by storing a first snapshot of a trailer that is generated by at least one camera that is local to a vehicle that includes the trailer, responding to a subsequent second triggering event by storing a second snapshot of the trailer that is generated by the at least one camera that is local to the vehicle that includes the trailer, comparing the first snapshot to the second snapshot and determining a deviation between the image of the first snapshot and the image of the second snapshot, and identifying a trailer load status change as having occurred in response to the deviation exceeding a predefined magnitude.

In a further embodiment of any of the above, the first triggering event is an ignition cycle end.

In a further embodiment of any of the above, the second triggering event is an ignition cycle start.

In a further embodiment of any of the above, the first triggering event is an ignition cycle end, the second triggering event is an ignition cycle start, and there are no intervening ignition cycles between the ignition cycle end and the subsequent ignition cycle start.

In a further embodiment of any of the above, the method further includes using an object detection algorithm to detect the trailer in each of the first snapshot and the second snapshot prior to comparing the first snapshot to the second snapshot.

In a further embodiment of any of the above, the deviation includes a change in the position within the image of the detected trailer object between the first snapshot and the second snapshot.

In a further embodiment of any of the above, identifying the change in position includes detecting a set of positional changes and normalizing the positional changes to a single quantified value.

In a further embodiment of any of the above, the single quantified value is compared to the predefined magnitude.

In a further embodiment of any of the above, the method further includes responding to a change in load status by automatically detecting a level state of the trailer.

In a further embodiment of any of the above, automatically detecting the level state of the trailer includes receiving a plurality of inputs that include at least one of the first snapshot and the second snapshot at the trailer at a controller, and the controller outputting a level status of the trailer.

In a further embodiment of any of the above, the at least one camera is an identical camera in an identical configuration for the first snapshot and the second snapshot.

In a further embodiment of any of the above, the at least one camera is a rear facing camera that is mounted to a tractor.

In another exemplary embodiment, a system for detecting a trailer status change includes at least one camera that defines a field of view that includes a trailer, and a controller that includes a memory and is in communication with the at least one camera and the memory. The controller is configured to store instructions for causing the CMS to respond to first triggering event by storing a first snapshot of the trailer that is generated by the at least one camera respond to a subsequent second triggering event by storing a second snapshot of the trailer that is generated by the at least one camera. The first snapshot is compared to the second snapshot and determines a deviation between the image of the first snapshot and the image of the second snapshot and identifies a load status change as having occurred in response to the deviation exceeding a predefined magnitude.

In a further embodiment of any of the above, the memory further stores instructions for causing the controller to respond to a change in load status by automatically detecting a level state of the trailer.

In a further embodiment of any of the above, the at least one camera includes a rear facing mirror replacement camera.

In a further embodiment of any of the above, the rear facing mirror replacement camera is disposed in a camera arm that extends from one of a driver side of a cab and a passenger side of the cab.

In a further embodiment of any of the above, the first triggering event is an ignition cycle end.

In a further embodiment of any of the above, the second triggering event is an ignition cycle start.

In a further embodiment of any of the above, the first triggering event is an ignition cycle end, the second triggering event is an ignition cycle start, and there are no intervening ignition cycles between the ignition cycle end and the subsequent ignition cycle start.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments unless such features are incompatible.

DETAILED DESCRIPTION

Figure 1A:
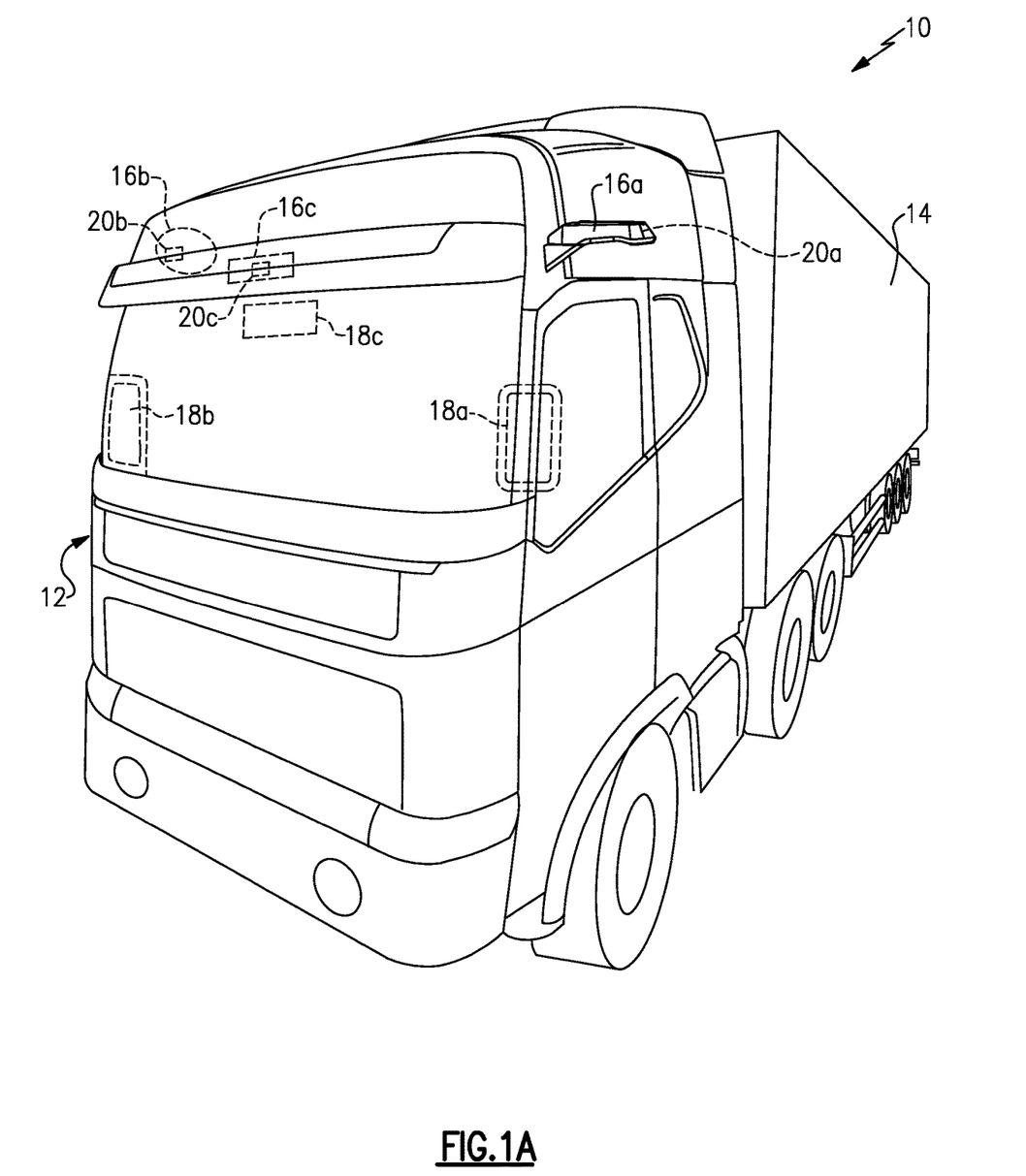
FIG. 1A is a schematic front view of a commercial truck with a camera monitor system (CMS) used to provide at least Class II and Class IV views.
Figure 1B:
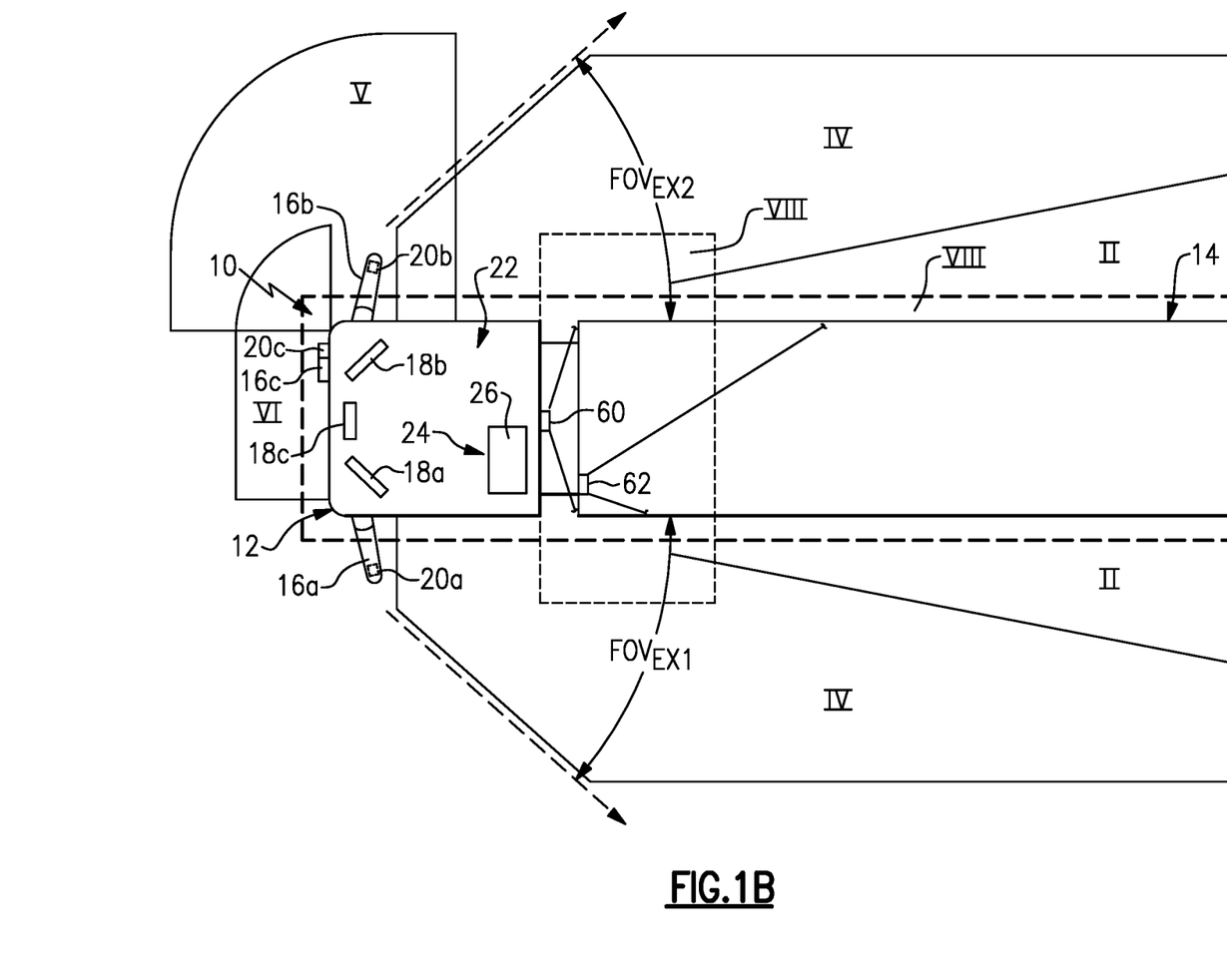
FIG. 1B is a schematic top elevational view of a commercial truck with a camera monitor system providing Class II, Class IV, Class V and Class VI views.
Figure 2:
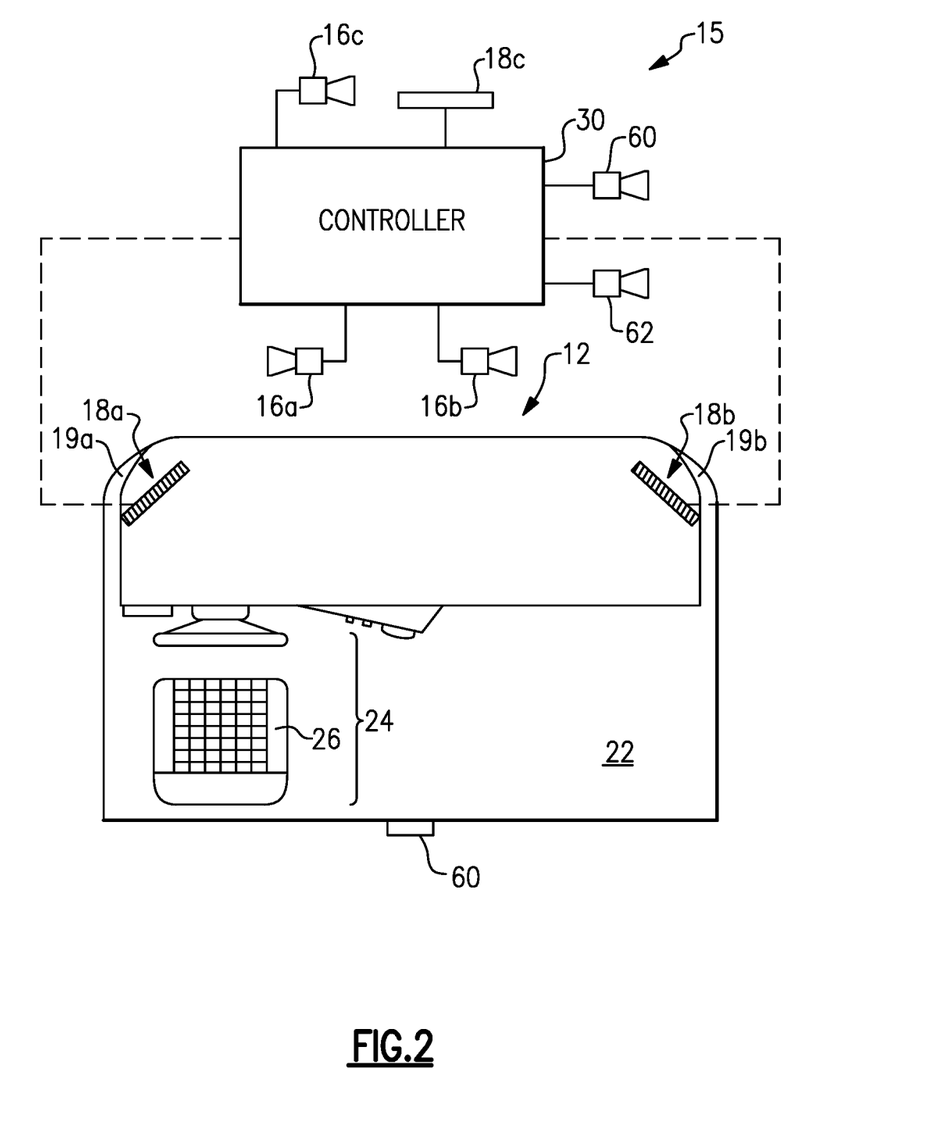
FIG. 2 is a schematic top perspective view of a vehicle cabin including displays and interior cameras.

A schematic view of a commercial vehicle 10 is illustrated in FIGS. 1A and 1B. FIG. 2 is a schematic top perspective view of the vehicle 10 cabin including displays and interior cameras. The vehicle 10 includes a vehicle cab or tractor 12 for pulling a trailer 14. It should be understood that the vehicle cab 12 and/or trailer 14 may be any configuration. Although a commercial truck is contemplated in this disclosure, the invention may also be applied to other types of vehicles. The vehicle 10 incorporates a camera monitor system (CMS) 15 (FIG. 2) that has driver and passenger side camera arms 16a, 16b mounted to the outside of the vehicle cab 12. If desired, the camera arms 16a, 16b may include conventional mirrors integrated with them as well, although the CMS 15 can be used to entirely replace mirrors. In additional examples, each side can include multiple camera arms, each arm housing one or more cameras and/or mirrors.

Each of the camera arms 16a, 16b includes a base that is secured to, for example, the cab 12. A pivoting arm may be supported by the base and may articulate relative thereto. At least one rearward facing camera 20a, 20b is arranged respectively within camera arms. The exterior cameras 20a, 20b respectively provide an exterior field of view $FOV_{EX1}$, $FOV_{EX2}$ that each include at least one of the Class II and Class IV views (FIG. 1B), which are legal prescribed views in the commercial trucking industry. Multiple cameras also may be used in each camera arm 16a, 16b to provide these views, if desired. Class II and Class IV views are defined in European R46 legislation, for example, and the United States and other countries have similar drive visibility requirements for commercial trucks. Any reference to a "Class" view is not intended to be limiting, but is intended as exemplary for the type of view provided to a display by a particular camera. Each arm 16a, 16b may also provide a housing that encloses electronics that are configured to provide various features of the CMS 15.

In one example shown in FIG. 1B, in addition to the cameras 20a, 20b in the camera arms 16a, 16b, the CMS 15 includes at least a rear facing camera 60, and an internal trailer camera 62. The rear facing camera 60 is mounted to the rear of the tractor 12 and captures a view of the exterior of the trailer 14, while the interior camera 62 is arranged within the trailer cargo area and captures a view of the interior of the trailer 14, including objects that are loaded into the trailer 14. In alternate examples, either camera 60, 62 can be a camera incorporated in a secondary system connected to the CMS 15, and configured to provide video feed to the controller 30, and the following description can function similarly.

First and second video displays 18a, 18b are arranged on each of the driver and passenger sides within the vehicle cab 12 on or near the A-pillars 19a, 19b to display Class II and Class IV views on its respective side of the vehicle 10, which provide rear facing side views along the vehicle 10 that are captured by the exterior cameras 20a, 20b.

If video of Class V and/or Class VI views are also desired, a camera housing 16c and camera 20c may be arranged at or near the front of the vehicle 10 to provide those views (FIG. 1B). A third display 18c arranged within the cab 12 near the top center of the windshield can be used to display the Class V and Class VI views, which are toward the front of the vehicle 10, to the driver. The displays 18a, 18b, 18c face a driver region 24 within the cabin 22 where an operator is seated on a driver seat 26. The location, size and field(s) of view streamed to any particular display may vary from the configurations described in this disclosure and still incorporate the disclosed invention.

If video of Class VIII views is desired, camera housings can be disposed at the sides and rear of the vehicle 10 to provide fields of view including some or all of the class VIII zones of the vehicle 10. In such examples, the third display 18c can include one or more frames displaying the class VIII views. Alternatively, additional displays can be added near the first, second and third displays 18a, 18b, 18c and provide a display dedicated to providing a class VIII view.

In some examples, the controller 30 is in communication with a vehicle controller and/or connected to a vehicle data bus (E.G., a CANN bus). The communication allows the controller 30 to receive and utilize sensor and operational information from the vehicle.

Figure 3:
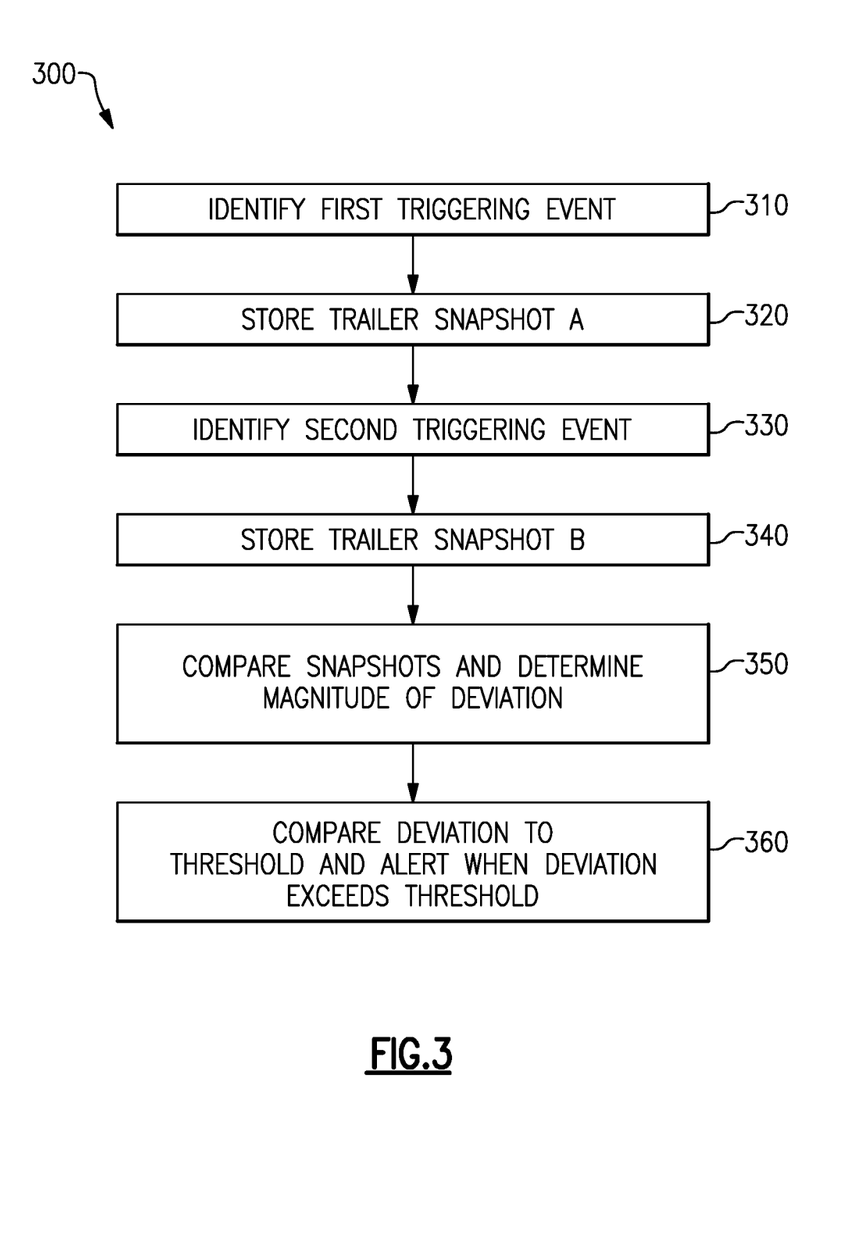
FIG. 3 illustrates a process for identifying a trailer load change.
Figure 4:
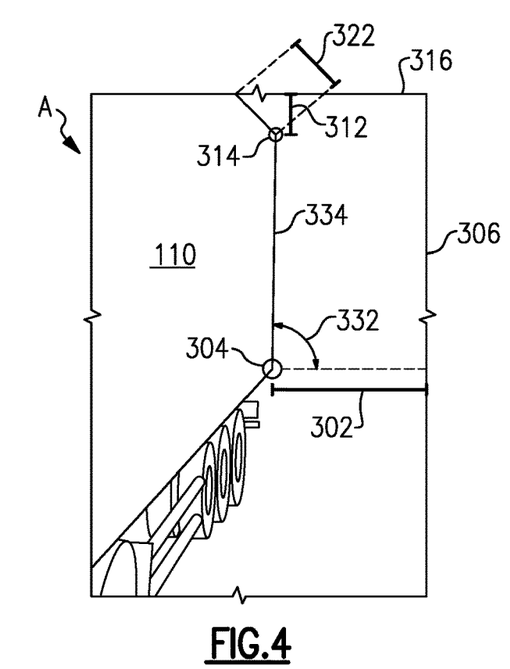
FIG. 4 illustrates an example CMS image including a trailer after a first engine cycle.
Figure 5:
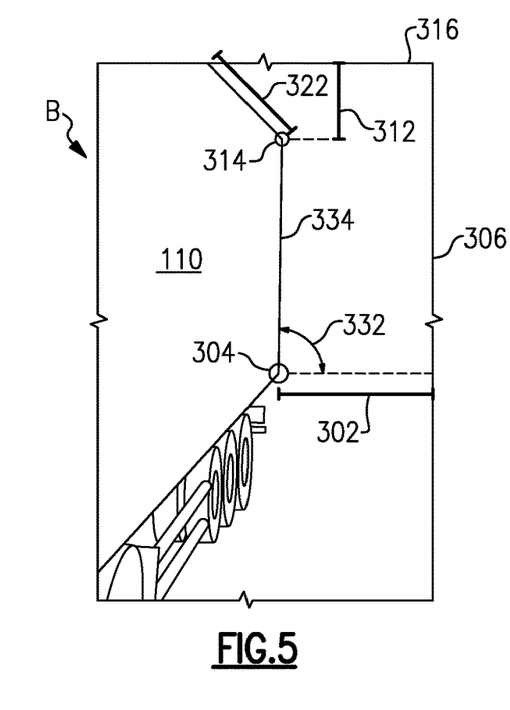
FIG. 5 illustrates an example CMS image of the trailer of FIG. 5 at the start of a second engine cycle.

With continued reference to FIGS. 1A-2, FIG. 3 illustrates a process 300 for identifying a load change in a trailer using the camera monitoring system 15. FIG. 4 illustrates an exemplary snapshot A of step 320 of the process 300. FIG. 5 illustrates an exemplary snapshot B of step 340 of the process 300. Initially, the controller 30 for the CMS 15 detects first triggering event in an "Identify First Triggering Event"" step 310. In one example, the first triggering event is an end of an ignition cycle (i.e., the vehicle operator turns the engine off). As used herein, an "ignition cycle" refers to a driving cycle that begins with engine start, meets the engine start condition for at least a predetermined period of time, and ends with an engine shutoff. In some examples the predetermined time can be at least two seconds.

After identifying the end of an ignition cycle, the controller 30 stores a first snapshot (snapshot A, illustrated in FIG. 4) containing at least a portion of the trailer 110 in a memory (e.g., local memory) in a "Store Trailer Snapshot A" step 320. In some examples, the controller 30 includes an object detection system and the portions of the snapshot corresponding to the trailer 110 can be identified and flagged for later analysis. In alternative examples, the stored snapshot can be stored in a memory (e.g., remote memory), with the controller 30 being configured to access the memory (e.g., remote memory) as required during the operation of the process 300. In examples, including the additional cameras 60, 62, the snapshot can further include the exterior view and the interior views generated by the additional cameras 60, 62 either as distinct images, or as a stitched together single image.

When the engine is restarted, the controller 30 identifies a second triggering event in an "Identify Second Triggering Event" step 330. In one example, the second triggering event is an engine cycle start (i.e., the engine being started by the vehicle operator). When the subsequent engine cycle starts, the controller 30 stores a second snapshot (Snapshot B, illustrated in FIG. 5) in a "Store Trailer Snapshot B" step 340. The second trailer snapshot (B) is generated using the same camera(s) in the same configuration as snapshot (A). With no changes to the loading of the trailer 110, the portion of the snapshots (A), (B) containing the trailer 110 would be approximately identical.

After storing the second snapshot (B), the controller 30 compares the snapshots (A), (B) to determine how much deviation there is between the image of the trailer 110 in snapshot (A) and the image of the trailer in snapshot (B). The deviation between the images refers generally to the differences between the trailer 110 portion of the images. These differences generally are the result of trailer status changes, such as loading change, lift gate opening, etc. In one example, the deviation is determined by applying an edge detection algorithm to the snapshots and determining a pixel difference of the identified edges between the first and second snapshot. The pixel difference is representative of how much the edge(s) have shifted within the image(s) of the snapshots.

In some cases, environmental changes (e.g., fog, rain or snow) can also result in smaller deviations requiring the use of a threshold to filter out false positives. When the controller 30 includes software based object recognition, the relative positions of the trailer 110 itself can be compared between the snapshots. By way of example, a distance 302 from a trailer corner 304 and an edge 306 of the image, a length 312 of the top edge of the trailer 110 that is visible in the image, an angle 332 of the rear trailer edge 334 relative to a ground plane, and/or any similar measurable aspects can be compared between the two snapshots (A), (B), and the determined differences are the deviation between the snapshots (A), (B). In examples where the interior camera 62 is included, the object detection is capable of utilizing feature based object detection and/or region of interest based methods to determine load reduction or increase by determining how many, and what types, of objects have been removed from and/or added to the trailer 14. In other examples, the entirety of the image is compared and any quantifiable measure of the difference between the two images can be utilized. In either case, the process 300 compares the snapshots in a "Compare Snapshots and Determine Magnitude of Deviation" step 350.

This deviation is quantified to determine a single "deviation" value with a numerical magnitude and the magnitude of the deviation value is compared to a threshold in a "Compare Deviation to Threshold and Alert when Deviation Exceeds Threshold" step 360. The alert is provided to the vehicle operator via any means including am audio indicator, visible alert, message sent to a messaging system, or any other means of notification. The notification informs the operator that the trailer 110 is not in the same position as when the previous engine cycle ended. Once so informed, the operator is able to manually check the trailer 110 and identify if the loading has changed, the lift gate is opened, or any similar function. The specific threshold value is dependent on the deviation quantification being used and can be set to a large enough magnitude that environmental variations (e.g. day to night shift, rain to cloudy shift, etc.) between engine cycles do not generate false positives.

In some examples, such as those where the trailer 14 is a box trailer, the inclusion of the rear facing camera 60 can provide further advantages. By way of example, the rear facing camera 60 has a square/rectangular perspective of the trailer 14 and the perspective is particularly well suited for trailer edge based evaluations of the trailer level using edge detection.

In some examples, identifying that the trailer 110 has shifted can be further used to trigger an automated leveling check. Parking and driving semi-trucks on unleveled surface/road can cause interference with the normal operations. Further, parking when the trailer is unlevel, either due to being on an unlevel surface, or due to an uneven load being loaded/unloaded, can change the operations of the vehicle and alter how the trailer responds to standard maneuvers.

The automated leveling check occurs using a depth perception technique that combines the trailer image, the steering wheel angle, an image of the road surface or an image of the wheel, a stickshift position, a trailer load status (e.g., loaded, unloaded, partially loaded) and the trailer dimensions or trailer height. The automated level check uses depth perception combined with the data from the sensors and cameras received from the controller 30, and the vehicle controller through the communication connections to determine first whether the trailer is unlevel, and second how unlevel the trailer is. The magnitude of the unlevelness is reported as an angle of the trailer bed relative to an angle of the ground plane.

In certain examples, one or more camera from the CMS 15 can provide additional views that are analyzed and can identify potential causes for the unlevelness. By way of example, rear facing cameras including a view of the wheels may be able to identify whether one or more wheels has overrun a curb, crossed into a grass area, or any similar instance. This information is then correlated and can be provided to the vehicle operator allowing the operator to distinguish between an unlevel trailer bed due to uneven loading and/or mechanical features of the trailer 110, and an unlevel trailer bed due to environmental features. This in turn allows the operator to use the information to adapt vehicle operations in the correct manner.

Figure 6:
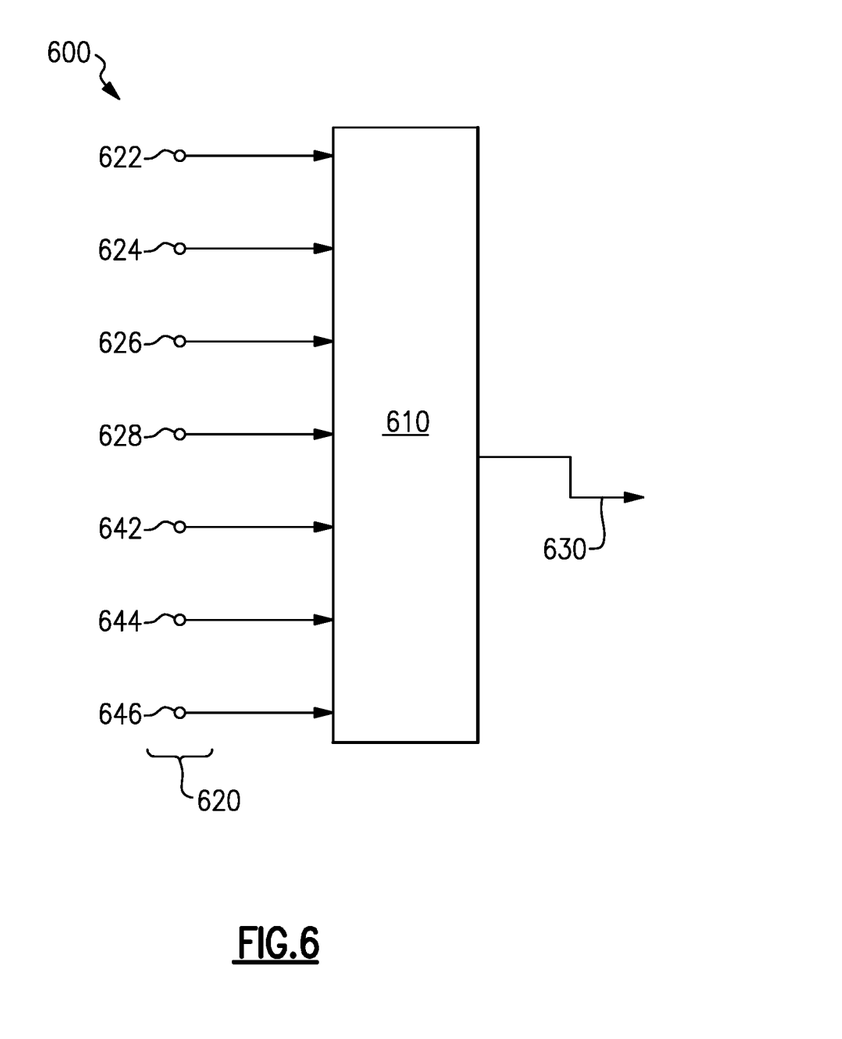
FIG. 6 illustrates an optional system for identifying a severity of trailer unleveling due to a load change detected with the process of FIG. 3.

With continued reference to the process of FIG. 3, FIG. 6 schematically illustrates a control system 600 including an algorithm 610 configured to receive multiple inputs 620 from a controller 30 and/or a vehicle communication bus (E.G., CANN bus) and an output 630 configured to output a value indicative of the level or unlevel state of the trailer. In some examples, the inputs 620 can include a complete trailer image 622 from the CMS, a steering wheel angle 624 from the vehicle controller, a road surface image 626 from the CMS, an image of one or more of the wheel(s) in the trailer 628, a current gear 642 from the vehicle controller, a trailer load status 644 from either the CMS, the vehicle controller, or a manual entry from the vehicle operator, and a set of trailer dimensions 646 from the CMS or a manual entry from the vehicle operator.

In alternative examples, any combination of the above values can be provided to the algorithm 610, and a corresponding unlevel value 630 can be output from the algorithm 610.

In some examples, the algorithm 610 outputs a binary "level" or "unlevel" value that provides a simple alert to the vehicle operator can compensate accordingly. In other examples, the output 630 can be a vector value indicative of the magnitude of tilt of the trailer bed, as well as a direction of the tilt. In the latter case, the vector value can be used by driver assist systems, automated driver systems, and any similar system able to either automatically compensate for the tilt or provide instructions for the vehicle operator to compensate for the tilt.

As described above, the controller 30 can be used to implement the various functionality disclosed in this application. The controller 30 may include one or more discrete units. In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller 30 may be a hardware device for executing software, particularly software stored in memory. The controller 30 can be a custom made or commercially available processor, a central processing unit (CPU), an auxiliary processor among several processors associated with the controller, a semiconductor-based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. The memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The disclosed input and output devices that may be coupled to system I/O interface(s) may include input devices, for example but not limited to, a keyboard, mouse, scanner, microphone, camera, mobile device, proximity device, etc. Further, the output devices, for example but not limited to, a printer, display, etc. Finally, the input and output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the controller 30 is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

While described above within the context of a specific mirror replacement system, it should be appreciated that the process can be applied to any camera monitoring system including a camera capturing all or part of the trailer within its field of view.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method for detecting a load status change of a trailer comprising:
   responding to a first triggering event by storing a first snapshot of a portion of a trailer generated by at least one camera local to a vehicle including the trailer;
   responding to a subsequent second triggering event by storing a second snapshot of the portion of the trailer generated by the at least one camera local to the vehicle including the trailer;
   comparing the positions of the portion of the trailer in the first snapshot to the second snapshot and determining a deviation between the position of the portion of the trailer in the first snapshot and the position of the portion of the trailer in the second snapshot; and
   identifying a trailer load status change as having occurred in response to the deviation exceeding a predefined magnitude.

2. The method of claim 1, wherein the first triggering event is an ignition cycle end.

3. The method of claim 1, wherein the second triggering event is an ignition cycle start.

4. The method of claim 1, wherein the first triggering event is an ignition cycle end, the second triggering event is an ignition cycle start, and there are no intervening ignition cycles between the ignition cycle end and the subsequent ignition cycle start.

5. The method of claim 1, further comprising using an object detection algorithm to detect the trailer in each of the first snapshot and the second snapshot prior to comparing the first snapshot to the second snapshot.

6. The method of claim 5, wherein identifying the change in position comprises detecting a set of positional changes and normalizing the positional changes to a single quantified value.

7. The method of claim 6, wherein the single quantified value is compared to the predefined magnitude.

8. The method of claim 1, further comprising:
   responding to a change in load status by automatically detecting a level state of the trailer.

9. The method of claim 8, wherein automatically detecting the level state of the trailer comprises receiving a plurality of inputs including at least one of the first snapshot and the second snapshot at the trailer at a controller, and the controller outputting a level status of the trailer.

10. The method of claim 1, wherein the at least one camera is an identical camera in an identical configuration for the first snapshot and the second snapshot.

11. The method of claim 10, wherein the at least one camera is a rear facing camera mounted to a tractor.

12. A camera monitor system (CMS) for detecting a trailer status change comprising:
   at least one camera defining a field of view including a trailer; and
   a controller including a memory and in communication with the at least one camera and the memory, the controller configured to store instructions for causing the CMS to respond to first triggering event by storing a first snapshot of a portion of the trailer generated by the at least one camera respond to a subsequent second triggering event by storing a second snapshot of the portion of the trailer generated by the at least one camera, compare the positions of the portion of the trailer in the first snapshot to the second snapshot and determining a deviation between the position of the portion of the trailer in the first snapshot and the position of the portion of the trailer in the second snapshot and identifying a load status change as having occurred in response to the deviation exceeding a predefined magnitude.

13. The CMS of claim 12, wherein the memory further stores instructions for causing the controller to respond to a change in load status by automatically detecting a level state of the trailer.

14. The CMS of claim 12, wherein the at least one camera includes a rear facing mirror replacement camera.

15. The CMS of claim 14, wherein the rear facing mirror replacement camera is disposed in a camera arm extending from one of a driver side of a cab and a passenger side of the cab.

16. The CMS of claim 12, wherein the first triggering event is an ignition cycle end.

17. The CMS of claim 12, wherein the second triggering event is an ignition cycle start.

18. The CMS of claim 12, wherein the first triggering event is an ignition cycle end, the second triggering event is an ignition cycle start, and there are no intervening ignition cycles between the ignition cycle end and the subsequent ignition cycle start.

* * * * *